United States Patent
Hanson et al.

(10) Patent No.: US 9,091,539 B2
(45) Date of Patent: Jul. 28, 2015

(54) GYROSCOPE DYNAMIC MOTOR AMPLITUDE COMPENSATION FOR ENHANCED RATE ESTIMATION DURING STARTUP

(75) Inventors: Timothy J. Hanson, Plymouth, MN (US); Mark W. Weber, Zimmerman, MN (US); Saul LaCoursiere, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 1083 days.

(21) Appl. No.: 13/157,431

(22) Filed: Jun. 10, 2011

(65) Prior Publication Data

US 2012/0312095 A1    Dec. 13, 2012

(51) Int. Cl.
    *G01C 19/00*    (2013.01)
(52) U.S. Cl.
    CPC ............. *G01C 19/00* (2013.01); *Y10T 74/1229* (2015.01)
(58) Field of Classification Search
    CPC ....... G01C 25/005; G01C 25/00; G01C 19/56
    USPC ................................ 73/1.77, 504.12, 504.02
    See application file for complete search history.

(56) References Cited

U.S. PATENT DOCUMENTS

| | | | |
|---|---|---|---|
| 5,751,131 A | 5/1998 | Sears | |
| 6,064,169 A | 5/2000 | Ward | |
| 6,725,169 B2 | 4/2004 | Thielman | |
| 6,792,802 B2 | 9/2004 | Platt | |
| 6,865,944 B2 | 3/2005 | Glenn | |
| 6,982,538 B2 | 1/2006 | White | |
| 7,190,237 B2 | 3/2007 | Zivanovic | |
| 2006/0238260 A1 | 10/2006 | Demma | |
| 2010/0077856 A1* | 4/2010 | Troske et al. | 73/504.02 |

OTHER PUBLICATIONS

"Atlantic Inertial Systems", "MEMS Technology Briefing", Aug. 2009, pp. 1-2, Publisher: Atlantic Inertial Systems.

* cited by examiner

*Primary Examiner* — Hezron E Williams
*Assistant Examiner* — Tarun Sinha
(74) *Attorney, Agent, or Firm* — Fogg & Powers LLC

(57) ABSTRACT

A system for gyroscope dynamic motor amplitude compensation during startup comprises various program modules, including an a-priori motor amplitude module configured to generate an a-priori motor amplitude signal based on a model of gyroscope motor amplitude growth during startup; a steady state scale factor module configured to generate a steady state scale factor signal; and a dynamic motor amplitude compensation module configured to receive the a-priori motor amplitude signal, and the steady state scale factor signal. During startup, rate motion is sensed by the gyroscope and a sensed rate signal is output by the gyroscope. The dynamic motor amplitude compensation module receives a measured motor amplitude signal from the gyroscope, the a-priori motor amplitude signal, or a combination thereof, and outputs a time varying scale factor that is applied to the sensed rate signal to produce an accurate sensed rate from the gyroscope during the startup phase.

12 Claims, 9 Drawing Sheets

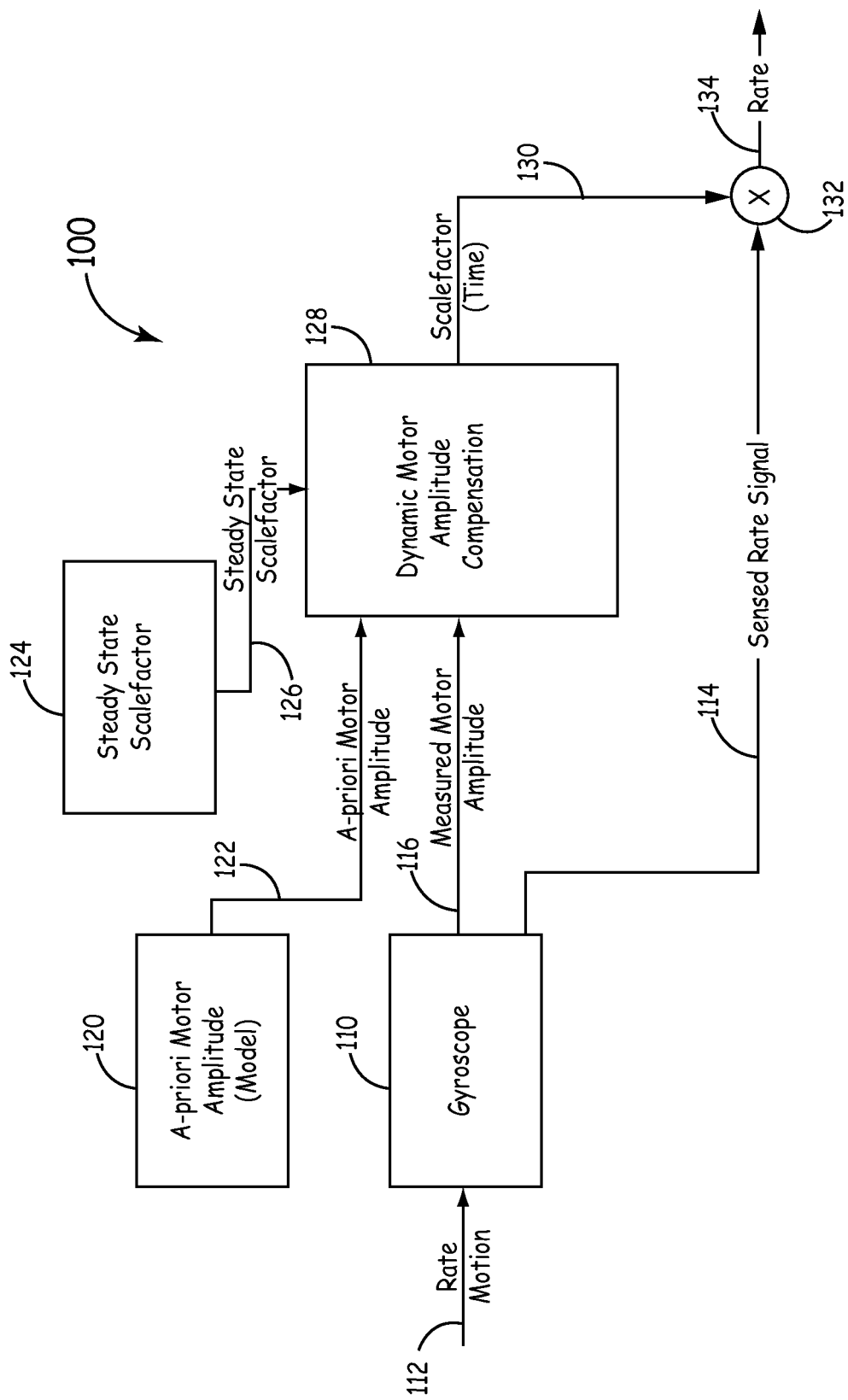

GYROSCOPE DYNAMIC MOTOR AMPLITUDE COMPENSATION FOR ENHANCED RATE ESTIMATION DURING STARTUP

BACKGROUND

During a gyroscope startup, the gyroscope motor takes a finite time to reach full steady state amplitude. During this time, rate estimates (if needed) are generally not accurate. Rate sensing with gyroscopes, such as a tuning fork gyroscope, have been largely avoided with current methods until the gyroscope motor is up and running in a steady state fashion.

In a tuning fork gyroscope, the sensed rate is proportional to the peak-to-peak amplitude of the oscillating proof-mass. Since this amplitude starts at zero (prior to power being applied) and then grows to final steady state amplitude over a period of time during startup, sensing rate during this time has not been feasible. Rather, sensing rate has been limited to periods after steady state motor amplitude is achieved.

Delays in achievable rate sensing from time of power application can be significant, depending upon how long it takes for the gyroscope motor to achieve full amplitude. Some gyroscope applications call for accurate performance very shortly after activation. For example, current tuning fork gyroscope devices such as those used in inertial measurement units (IMUs) and rate sensors can take approximately 0.4 to 3 seconds to reach accurate rate sensing operation. This delay can be intolerable for highly accurate guidance applications that require rate sensing information at the earliest possible point after power application.

SUMMARY

A system and method for gyroscope dynamic motor amplitude compensation during startup for improved rate sensing is provided. The system comprises at least one gyroscope, at least one processor in operative communication with the gyroscope, and at least one memory unit operatively coupled to the processor. The memory unit and the processor are configured to respectively store and execute program modules including an a-priori motor amplitude module configured to generate an a-priori motor amplitude signal based on a model of gyroscope motor amplitude growth during startup; a steady state scale factor module configured to generate a steady state scale factor signal; and a dynamic motor amplitude compensation module configured to receive the a-priori motor amplitude signal from the motor amplitude module, and the steady state scale factor signal from the steady state scale factor module. In performing the method during a startup phase for the gyroscope, a rate motion is sensed by the gyroscope and a sensed rate signal is output by the gyroscope. The dynamic motor amplitude compensation module receives a measured motor amplitude signal from the gyroscope, an a-priori motor amplitude signal from the motor amplitude module, or a combination thereof. The dynamic motor amplitude compensation module outputs a time varying scale factor that is applied to the sensed rate signal to produce an early and accurate sensed rate from the gyroscope during the startup phase.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which:

FIG. 1A is a block diagram of a control system for gyroscope dynamic motor amplitude compensation according to one embodiment;

DETAILED DESCRIPTION

Figure 1B:
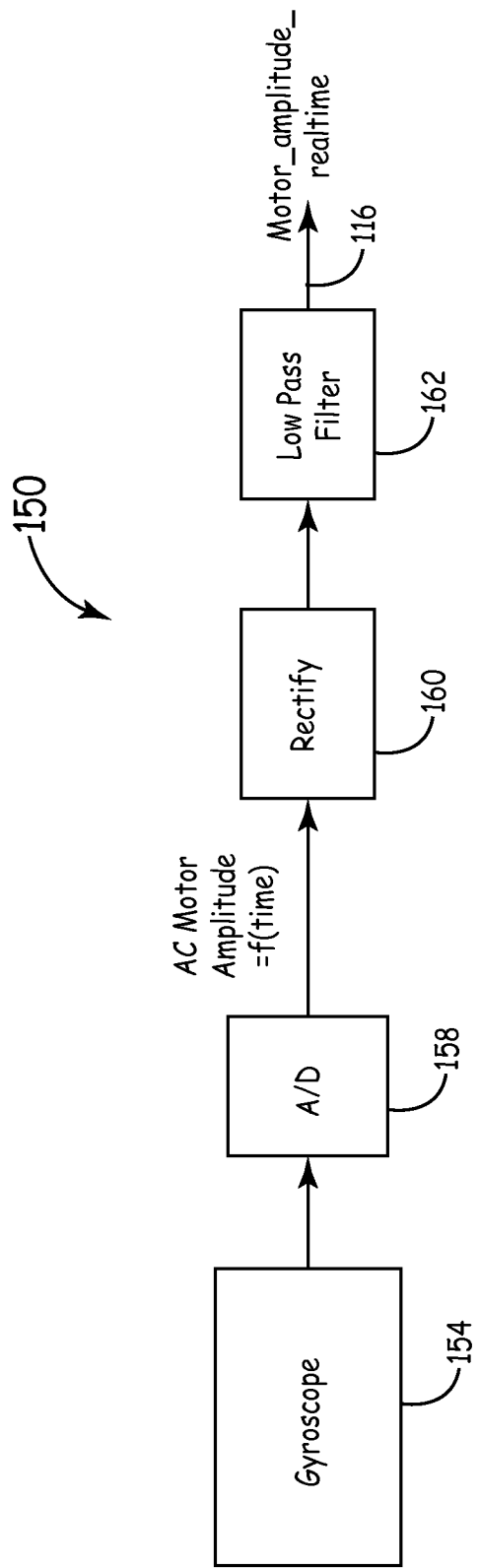
FIG. 1B is a block diagram of a supporting system for gyroscope dynamic motor amplitude compensation according to one embodiment.

In the following detailed description, reference is made to the accompanying drawings in which is shown by way of example specific illustrative embodiments. It is to be understood that other embodiments may be utilized and that mechanical and electrical changes may be made. The following detailed description is, therefore, not to be taken in a limiting sense.

A system and method are provided for gyroscope dynamic motor amplitude compensation, which enhances early rate estimation during gyroscope startup. During the startup time period between partial and full motor amplitude, the actual gyroscope scale factor is changing. The present approach allows rate sensing to be achieved during the startup phase of a gyroscope by applying a dynamically changing scale factor, which is a function of instantaneous motor amplitude. The result allows accurate rate sensing earlier in the power-up cycle of the gyroscope.

In one embodiment, a control system for a gyroscope dynamically uses motor amplitude at startup to adjust a scale factor, allowing early rate sensing before full and stable motor amplitude is achieved. The gyroscope motor amplitude between initial power application and steady state operation can be (1) measured in real-time, or can be (2) characterized a-priori based upon a mathematical model. For example, rate sensing via dynamic scale factor compensation can be derived from a real-time motor amplitude measurement, during the period from initial motor start to final steady state motor operation. Alternatively, rate sensing via dynamic scale factor compensation can be provided using a-priori mathematical characterization of motor amplitude, during the period from initial motor start to final steady state motor operation.

A dynamic scale factor function provides for stable rate sensing by using the gyroscope motor amplitude information during the startup phase of the gyroscope. This function exploits knowledge of real-time gyroscope motor amplitude to adjust the gyroscope scale factor such that stable and accurate rate sensing is achieved during the time period of gyroscope motor start, and earlier in time than in conventional gyroscope systems.

In one approach, the present method can be implemented in a real-time software compensation algorithm. The inputs to the algorithm are the raw gyroscope rate information, and the gyroscope operational configuration information, and knowledge of the gyroscope motor amplitude as a function of time. The algorithm provides for adjusting gain (otherwise known as scale factor) on the gyroscope rate output as a function of time. The algorithm can use (1) known a-priori information about gyroscope motor amplitude growth during the gyroscope start timeline, or the algorithm can use (2) real-time motor amplitude measurements from the gyroscope, or a combination of the two. The output of the algorithm is a compensated rate that provides accurate gyroscope rate information while the gyroscope motor is progressing from partial to full amplitude.

In another approach, the present method can be implemented entirely in analog electronics form to accomplish the same compensation algorithm.

The present method can be used to obtain earlier and more accurate gyroscope rate outputs by compensating dynamically for changing gyro motor amplitude during startup. The present approach can be implemented in real-time, and is adaptable to different gyroscope motor configurations and designs. The present system improves the start time of a gyroscope and improves the resulting rate sensing accuracy throughout the start sequence. This reduces the time between startup and full performance significantly. In addition, the system can be implemented in an analog or digital form.

Further details of the system and method are described hereafter with respect to the drawings.

FIG. 1A is a block diagram of a control system 100 for a gyroscope 110 according to one embodiment. The control system 100 generally includes an a-priori motor amplitude module 120, a steady state scale factor module 124, a dynamic motor amplitude compensation module 128, and a multiplier 132. The a-priori motor amplitude module 120 and steady state scale factor module 124 are both in operative communication with dynamic motor amplitude compensation module 128. The gyroscope 110 is in operative communication with dynamic motor amplitude compensation module 128 and multiplier 132. An output of dynamic motor amplitude compensation module 128 is in operative communication with multiplier 132.

The gyroscope 110 can be any one of a variety of gyroscopes, such as a tuning fork gyroscope, a spinning mass gyroscope, or a Micro-Electro-Mechanical Systems (MEMS) gyroscope. The present method can be applied to any gyroscope that has a finite startup time associated with its proof mass motion.

An a-priori motor amplitude module 120 includes a software package based on a mathematical model describing the rate of gyroscope motor amplitude growth during startup. For each rate sample at time t, motor amplitude achieved is (in fractional units):

$$\text{Motor\_ampl\_model}(t) = (t - T0)/(T2 - T0)$$

where:
t = time of rate data sample;
T0 = time of gyro motor reaching 10% of full amplitude;
T2 = time of gyro motor reaching full amplitude; and
Motor_ampl_model(t) = gyro motor amplitude at time t.

T0 is determined from the gyro motor start command. The calculation is only valid subject to the constraint: (t−T0)>10% of (T2−T0). T2 is determined by previous time to start characterization.

During operation of control system 100, a rate motion 112 is sensed by gyroscope 110 attached to a vehicle or other object whose rate is to be sensed (not shown). A sensed rate signal 114 is generated by gyroscope 110 and sent to multiplier 132. In one embodiment, a measured motor amplitude signal 116 is output from gyroscope 110 and sent to dynamic motor amplitude compensation module 128 for further processing. In another embodiment, if the motor amplitude startup of gyroscope 110 is predictable, an a-priori motor amplitude signal 122 is output from motor amplitude module 120 and transmitted to dynamic motor amplitude compensation module 128. Alternatively, both the measured motor amplitude signal 116 and the a-priori motor amplitude signal 122 can be transmitted to dynamic motor amplitude compensation module 128 if needed.

A steady state scale factor signal 126 is output from steady state scale factor module 124 and is sent to dynamic motor amplitude compensation module 128 to be modified. The steady state scale factor signal 126 is used unmodified immediately after full gyro motor amplitude is reached, and continues to be used during steady state operation of gyroscope 110.

As the various signals received by dynamic motor amplitude compensation module 128 are processed using a motor amplitude rate compensation algorithm, a time varying scale factor 130 is output from dynamic motor amplitude compensation module 128 and sent to multiplier 132. The sensed rate signal 114 from gyroscope 110 is multiplied by time varying scale factor 130 at multiplier 132, which outputs an adjusted sensed rate 134.

FIG. 1B is a block diagram of a supporting system 150 for gyroscope dynamic motor amplitude compensation according to one embodiment. In supporting system 150, a measured motor amplitude can be generated by hardware circuits coupled to a gyroscope 154. The hardware circuits include an analog-to-digital converter (A/D) 158 operatively coupled to the gyroscope, a rectify circuit 160 operatively coupled to an output of A/D 158, and a low pass filter 162 operatively coupled to an output of rectify circuit 160.

A real-time measure of gyroscope motor amplitude can be obtained in supporting system 150 by analog pickoff of an AC motor amplitude signal from gyroscope 154, followed by an analog-to-digital-conversion of the motor amplitude signal by A/D 158. The digitized motor amplitude signal from A/D 158 is transmitted to rectify circuit 160 to perform rectification operations. The rectified signal is then transmitted through low pass filter 162, which results in a real-time measurement of a gyroscope motor amplitude 116 that can be used in turn to properly scale the actual sensed gyroscope rate.

Figure 2:
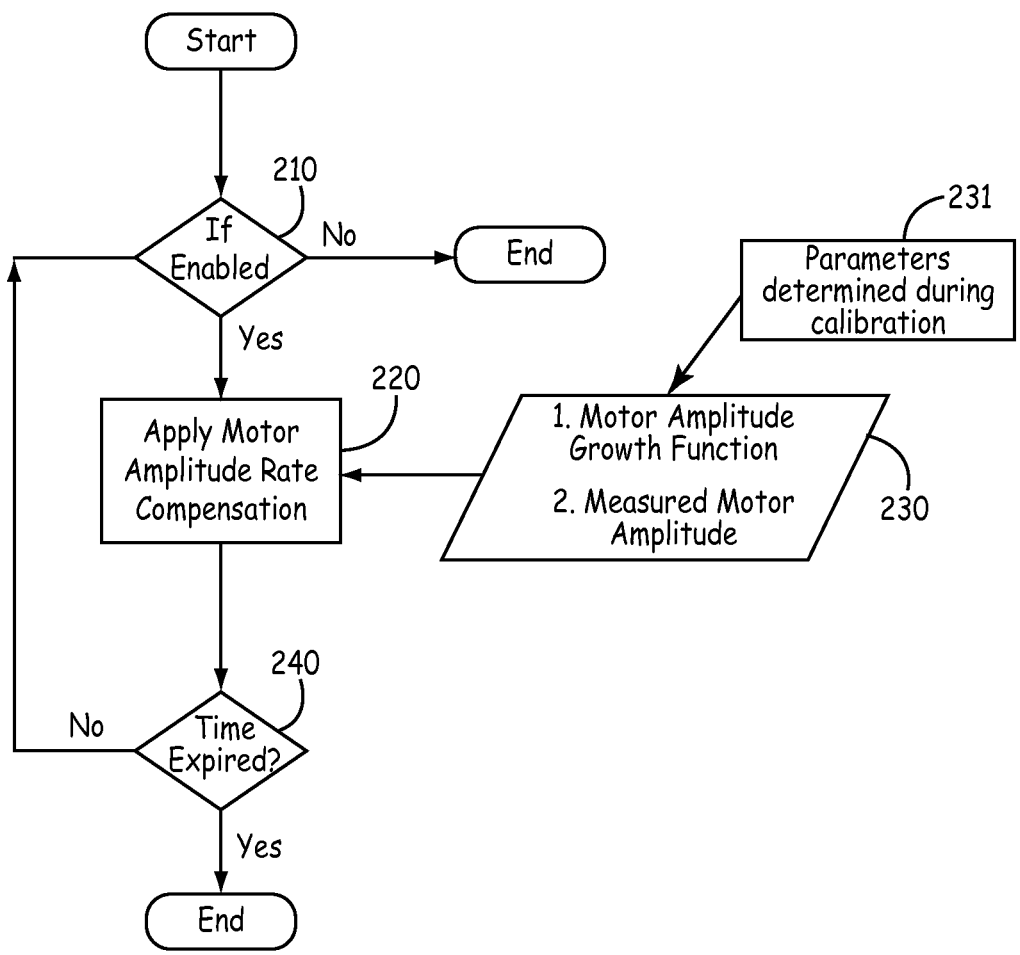
FIG. 2 is a flow diagram of a process for dynamic scale factor compensation employed in the control system of FIG. 1A.
Figure 3:
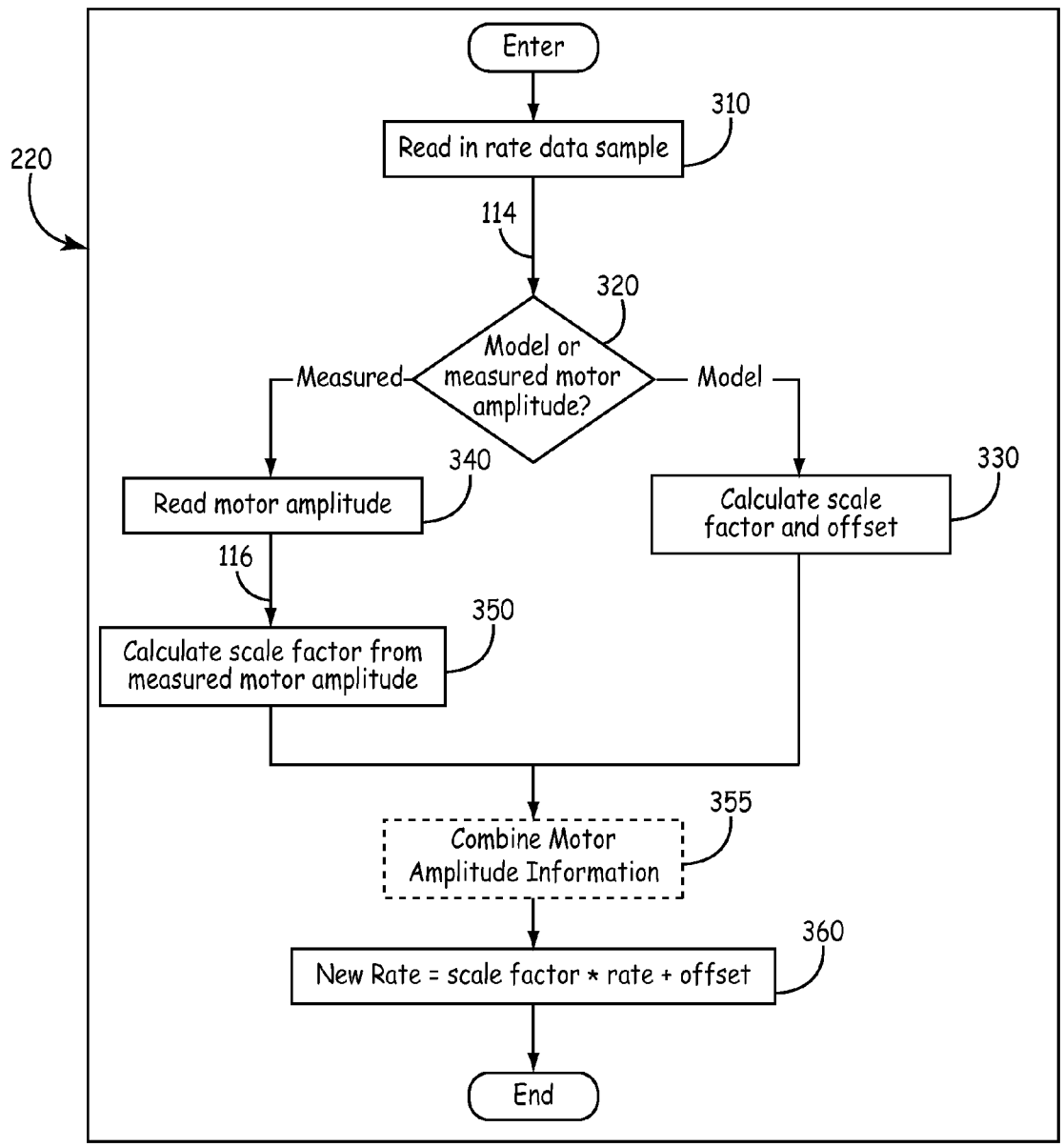
FIG. 3 is a flow diagram of a motor amplitude rate compensation algorithm employed in the process of FIG. 2.

FIGS. 2 and 3 are flow diagrams illustrating further details of the present method for dynamic scale factor compensation. The method can be carried out for a single gyroscope, or for a plurality of gyroscopes such as in an inertial measurement unit (IMU). Typically, the IMU will have three gyroscopes with respective channels, and the present method can be run separately in each of the gyroscope channels.

As shown in FIG. 2, at the start of the method, a determination is made whether the control system (such as shown in FIG. 1A) is enabled at 210. If the control system is enabled, a motor amplitude rate compensation algorithm 220 is run for a predetermined time period. The time period can range from about 0.1 seconds to about 3 seconds, and occurs during the startup phase of the gyroscope. Data from the model motor amplitude growth function (i.e., a-priori motor amplitude) and/or a measured motor amplitude (block 230) are input to motor amplitude rate compensation algorithm 220 while the algorithm runs. Supporting parameters 231 can be determined during calibration or other characterizations of the gyroscope. Further details of the motor amplitude rate compensation algorithm are described hereafter with respect to FIG. 3.

A determination is made whether the time period of motor amplitude compensation has expired at 240. If the time period has not expired, the method loops back and the rate compensation algorithm 220 is run again. The operational frequency of this loop is selectable, but typically will be about 600 Hz. The rate compensation algorithm is repeatedly run while the control system remains enabled and the time period has not expired. When the time period has expired, the method ends.

FIG. 3 is a flow diagram illustrating further details of the motor amplitude rate compensation algorithm 220. When the algorithm is entered, a rate data sample 114 is read at 310, and a determination is made whether to apply the a-priori motor amplitude model or the measured motor amplitude at 320. If the a-priori motor amplitude model is applied, a scale factor and offset (bias) is calculated at 330. The algorithm used to calculate the a-priori scale factor is determined as a function of time as follows:

```
If (t < T2)
    scalefactor(t) = 1/Motor_ampl_model(t);
Else if (t > T2)
    scalefactor(t) = Steady State Scalefactor
end
where:
    t = time of rate data sample;
    T2 = time of gyro motor reaching full amplitude; and
    Motor_ampl_model(t) = ( t – T0 )/( T2 – T0 ).
```

If the measured motor amplitude is applied, the motor amplitude is read at 340 and a real-time scale factor from the measured motor amplitude signal 116 is calculated at 350. The algorithm used to calculate the real-time scale factor is as follows:

```
If (t < T2)
    scalefactor(t) = Mo/Motor_amplitude_realtime(t);
Else if (t > T2)
    scalefactor(t) = Steady State Scalefactor
end
where:
    t = time of rate data sample; and
    T2 = time of gyro motor reaching full amplitude.
    Mo = steady state full motor amplitude, determined at
    calibration. This calculation is only valid for
    Motor_amplitude_realtime(t) > 10% of Mo.
```

The a-priori motor amplitude information and the measured motor amplitude information can be applied individually, or can optionally be combined together to form the scale factor at 355. A new compensated rate is then calculated at 360.

When the a-priori motor amplitude information is applied, the adjusted sensed rate can be calculated by multiplying the scale factor of the model motor amplitude growth function by the input rate data sample, and adding any offset. The offset (bias) is a parameter determined during calibration of the gyroscope. The offset is a gyroscope rate signal generated when the gyroscope is in a static (zero rate input) condition. When the measured motor amplitude information is applied, the adjusted sensed rate can be calculated by multiplying the scale factor of the measured motor amplitude growth function by the input rate data sample, and adding any offset. Alternatively, the adjusted sensed rate can be calculated by multiplying the average, or other combination, of the a-priori and the measured scale factors by the input rate data sample, and adding any offset signal.

Figure 4:
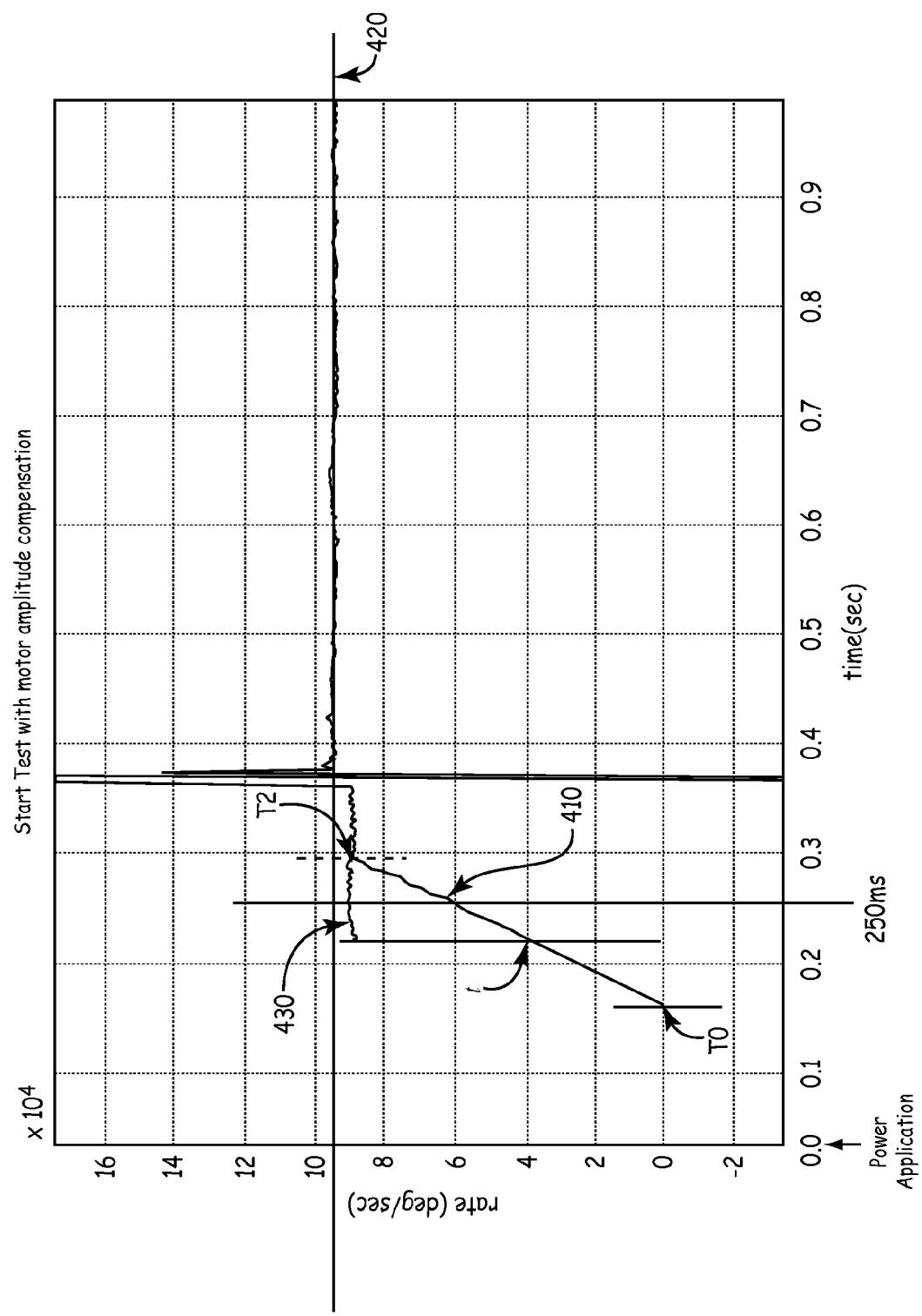
FIG. 4 is a graphical plot showing the results of a gyroscope start test with motor amplitude rate compensation.

FIG. 4 is a graphical plot showing the results of a MEMS gyroscope start test with motor amplitude rate compensation. The plot denotes power application at time 0.0, gyro motor drive start time T0, digital rate data out time t, original rate out 410, actual input rate 420, time of full motor amplitude T2, and motor amplitude compensated rate out 430. Note that the motor amplitude compensated rate 430 is much closer to the actual rate 420 during the startup phase between 0.22 and 0.30 seconds, as compared to the inaccurate original rate 410 during the same period.

Figure 5:
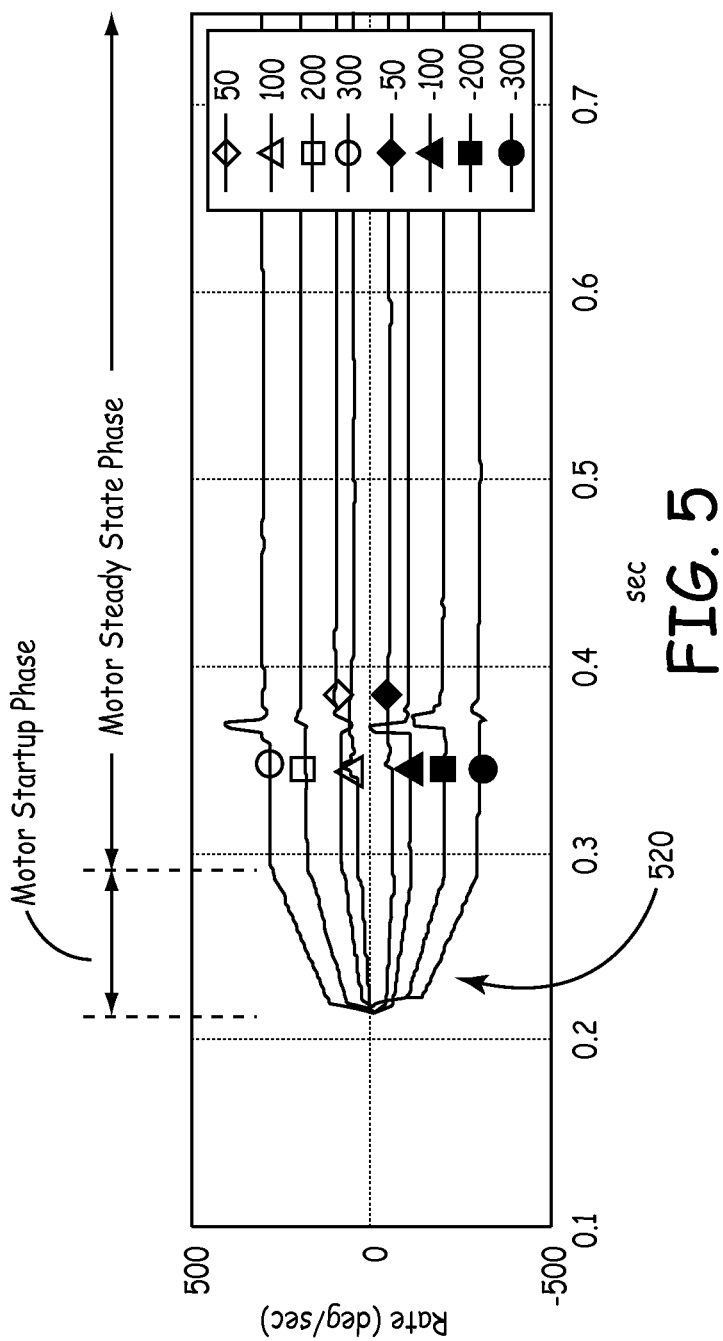
FIG. 5 is a graphical plot showing data from eight gyroscope turn-ons while at rate.

FIG. 5 is a graphical plot showing actual test data from eight gyroscope turn-ons while at rate. The eight input rates were presented to the gyroscope from a single axis rate table, and had numerical values of 50, 100, 200, 300, −50, −100, −200, and −300 (degrees/second). The changing gyroscope motor amplitude growth, as reflected in the increasing rate output during the startup phase, is shown at 520.

Figure 6:
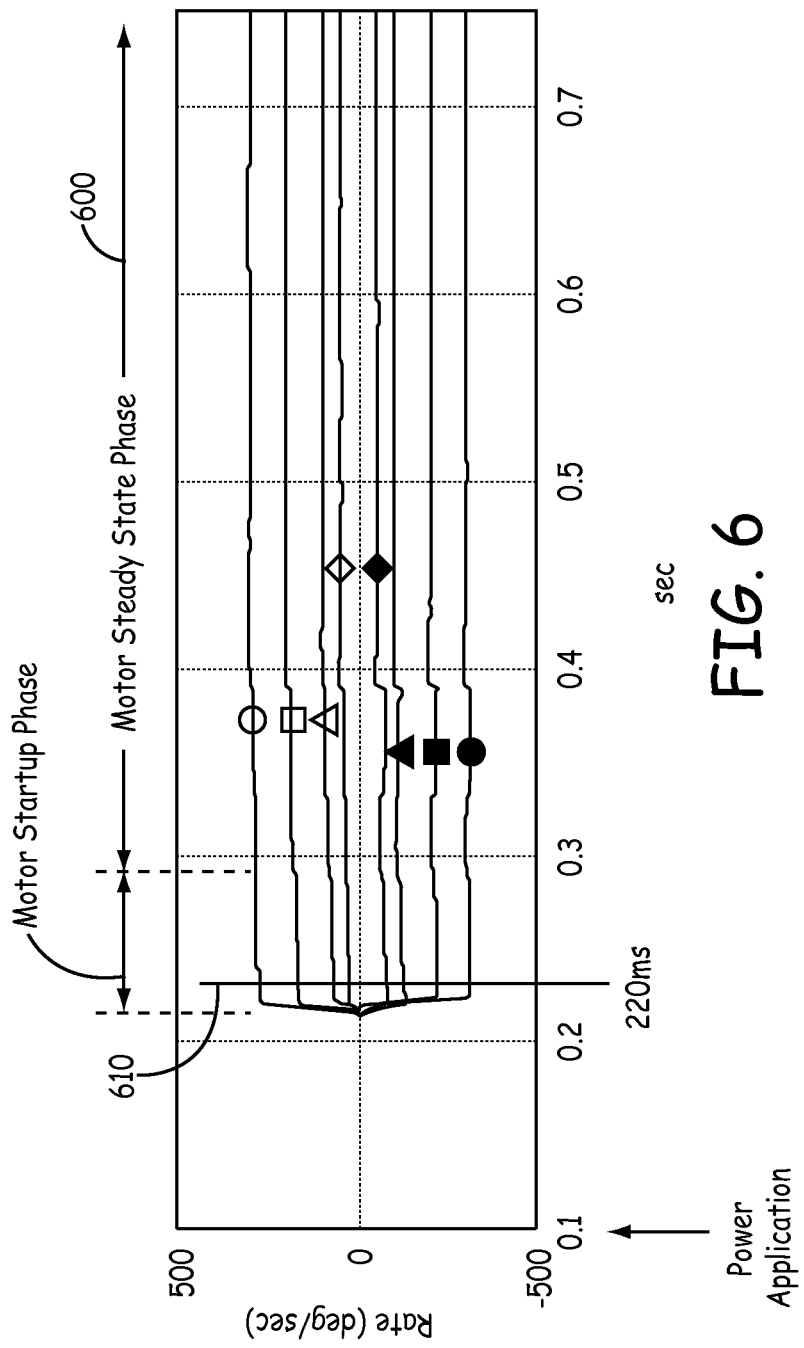
FIG. 6 is a graphical plot showing the same data as the plot of FIG. 5, but with motor amplitude rate compensation applied.

FIG. 6 is a graphical plot showing the same data as the plot of FIG. 5, but after applying motor amplitude compensation and filtering of transients. As shown in FIG. 6, at 220 ms after power application, the measured startup gyro rate is substantially the same as the steady state gyro rate seen in the motor steady state phase 600. The performance gain realized with this test lies in the much improved rate estimation during the motor startup phase 610.

Figure 7:
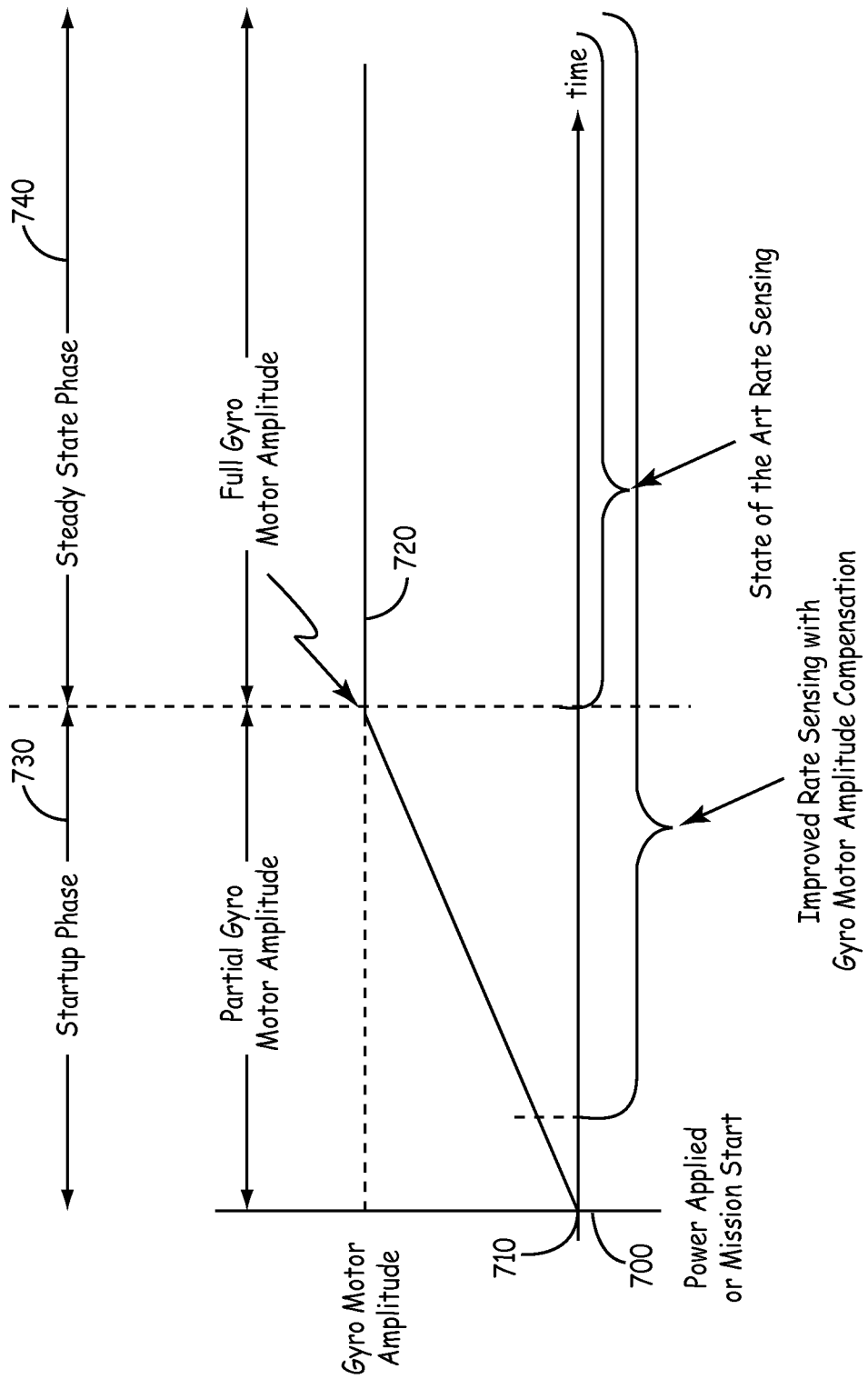
FIG. 7 is a timeline diagram showing the main phases of gyroscope startup.

FIG. 7 is a timeline showing the key phases of gyroscope startup. Prior to power application, the gyroscope is not operating. At power application 700, the gyroscope motor begins to operate and its amplitude grows from zero at 710 to a steady state value 720 during a startup phase 730. Then, the gyroscope operates at full motor amplitude and enters a steady state phase 740 of operation. The present system and method allow the gyroscope to provide accurate and usable rate sensing during the startup phase 730.

Figure 8:
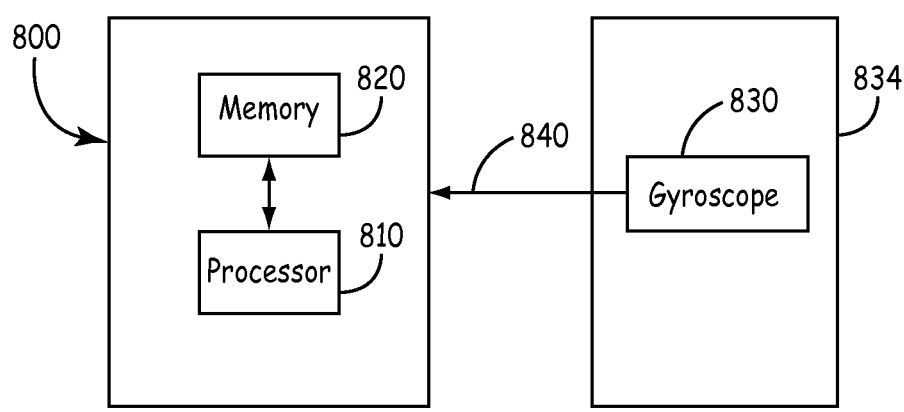
FIG. 8 is a block diagram of one embodiment of a computer system that can implement a process for gyroscope dynamic motor amplitude compensation.

FIG. 8 is a block diagram of one embodiment of a computer system 800 that can implement the present system and method. The computer system 800 generally includes at least one processor 810, and at least one memory unit 820 operatively coupled to processor 810. The computer system 800 is operatively coupled to at least one gyroscope 830, such as in an IMU 834, through a wired or wireless connection 840. The memory unit 820 includes at least one computer readable medium having instructions executable by processor 810 to perform the present method.

The processor 810 can be implemented using software, firmware, hardware, or any appropriate combination thereof, as known to one of skill in the art. By way of example and not limitation, hardware components for processor 810 can include one or more microprocessors, memory elements, digital signal processing (DSP) elements, interface cards, and other standard components known in the art. Any of the foregoing may be supplemented by, or incorporated in, specially-designed application-specific integrated circuits (ASICs) or field programmable gate arrays (FPGAs). In this exemplary embodiment, processor 810 includes or functions with software programs, firmware, or other computer readable instructions for carrying out various process tasks, calculations, and control functions, used in the present method. These instructions are typically tangibly embodied on any appropriate computer program product that includes a computer readable medium used for storage of computer readable instructions or data structures.

The memory unit 820 can be implemented with any available computer readable storage media that can be accessed by a general purpose or special purpose computer or processor, or any programmable logic device. Suitable computer readable media may include storage or memory media such as magnetic or optical media. For example, storage or memory media may include conventional hard disks, Compact Disk-Read Only Memory (CD-ROM), DVDs, volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), and the like), Read Only Memory (ROM), Electrically Erasable Programmable ROM (EEPROM), flash memory, Blu-ray discs, and the like. Combinations of the above are also included within the scope of computer readable media.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Although specific embodiments have been illustrated and described herein, it will be appreciated by those of ordinary skill in the art that any arrangement, which is calculated to achieve the same purpose, may be substituted for the specific embodiments shown. The described embodiments are to be considered in all respects only as illustrative and not restrictive. The scope of the invention is therefore indicated by the following claims rather than by the foregoing description. All changes that come within the meaning and range of equivalency of the claims are to be embraced within their scope.

What is claimed is:

1. A system for gyroscope dynamic motor amplitude compensation during startup, the system comprising:
   at least one gyroscope;
   at least one processor in operative communication with the gyroscope;
   at least one memory unit operatively coupled to the processor;
   wherein the memory unit and the processor are configured to respectively store and execute program modules comprising:
      an a-priori motor amplitude module configured to generate an a-priori motor amplitude signal based on a model of gyroscope motor amplitude growth during startup;
      a steady state scale factor module configured to generate a steady state scale factor signal; and
      a dynamic motor amplitude compensation module configured to receive the a-priori motor amplitude signal from the motor amplitude module, and the steady state scale factor signal from the steady state scale factor module;
   wherein during a startup phase for the gyroscope:
      a rate motion is sensed by the gyroscope and a sensed rate signal is output by the gyroscope; and
      the dynamic motor amplitude compensation module is configured to:
         receive a measured motor amplitude signal from the gyroscope, the a-priori motor amplitude signal from the motor amplitude module, or a combination thereof;
         calculate a time varying scale factor based on:
            the steady state scale factor signal, and the a-priori motor amplitude signal or the measured motor amplitude signal, or
            the steady state scale factor signal, and a combination of the a-priori motor amplitude signal and the measured motor amplitude signal;
      wherein the sensed rate signal is multiplied by the time varying scale factor to determine an adjusted sensed rate for the gyroscope that provides motor amplitude compensation and accurate rate estimation during the startup phase for the gyroscope.

2. The system of claim 1, wherein the gyroscope comprises a tuning fork gyroscope.

3. The system of claim 1, wherein the gyroscope comprises a spinning mass gyroscope.

4. The system of claim 1, wherein the gyroscope is a micro-electro-mechanical systems (MEMS) gyroscope.

5. The system of claim 1, wherein the gyroscope is implemented in an inertial measurement unit.

6. The system of claim 5, wherein the inertial measurement unit includes three gyroscopes.

7. The method of claim 1, wherein the gyroscope is implemented in an inertial measurement unit.

8. The method of claim 7, wherein the inertial measurement unit includes three gyroscopes.

9. A method for gyroscope dynamic motor amplitude compensation during startup, the method comprising:
   outputting a sensed rate signal from at least one gyroscope;
   receiving an a-priori motor amplitude signal or a measured motor amplitude signal, or both the a-priori motor amplitude signal and the measured motor amplitude signal;
   receiving a steady state scale factor signal;
   calculating a time varying scale factor based on:
      the steady state scale factor signal, and the a-priori motor amplitude signal or the measured motor amplitude signal, or
      the steady state scale factor signal, and a combination of the a-priori motor amplitude signal and the measured motor amplitude signal; and
   multiplying the sensed rate signal by the time varying scale factor to determine an adjusted sensed rate for the gyroscope that provides motor amplitude compensation and accurate rate estimation during gyroscope motor startup.

10. The method of claim 9, wherein the gyroscope comprises a tuning fork gyroscope or a spinning mass gyroscope.

11. The method of claim 9, wherein the gyroscope is a MEMS gyroscope.

12. A computer program product, comprising:
   a non-transitory computer readable medium having instructions stored thereon executable by a processor to perform a method for gyroscope dynamic motor amplitude compensation during startup, the method comprising:
   outputting a sensed rate signal from at least one gyroscope;
   receiving an a-priori motor amplitude signal or a measured motor amplitude signal, or both the a-priori amplitude signal and the measured motor amplitude signal;
   receiving a steady state scale factor signal;
   calculating a time varying scale factor based on:
      the steady state scale factor signal, and the a-priori motor amplitude signal or the measured motor amplitude signal, or the steady state scale factor signal, and a combination of the a-priori motor amplitude signal and the measured motor amplitude signal;

and
multiplying the sensed rate signal by the time varying scale factor to determine an adjusted sensed rate for the gyroscope that provides motor amplitude compensation and accurate rate estimation during gyroscope motor startup.

\* \* \* \* \*